United States Patent
Spurlock et al.

(10) Patent No.: US 8,866,795 B1
(45) Date of Patent: Oct. 21, 2014

(54) CURRENT SENSOR OUTPUT MEASUREMENT SYSTEM AND METHOD

(75) Inventors: Brett Spurlock, Felton, CA (US);
Yansun Xu, Mountain View, CA (US);
Jahja Trisnadi, Cupertino, CA (US);
Steve Sanders, Los Altos, CA (US);
Clinton Carlisle, Palo Alto, CA (US);
Ke-Cai Zeng, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/598,464

(22) Filed: Aug. 29, 2012

Related U.S. Application Data

(63) Continuation of application No. 12/413,584, filed on Mar. 29, 2009, now abandoned.

(60) Provisional application No. 61/083,953, filed on Jul. 28, 2008.

(51) Int. Cl.
*G06F 3/045* (2006.01)
*G06F 3/01* (2006.01)

(52) U.S. Cl.
CPC ...................................... *G06F 3/016* (2013.01)
USPC ....................................................... 345/174

(58) Field of Classification Search
CPC combination set(s) only.
See application file for complete search history.

(56) References Cited

U.S. PATENT DOCUMENTS

| | | | |
|---|---|---|---|
| 6,995,747 B2 | 2/2006 | Casebolt et al. | |
| 6,995,748 B2 | 2/2006 | Gordon et al. | |
| 7,394,454 B2 * | 7/2008 | Kong | 345/163 |
| 8,094,133 B2 * | 1/2012 | Sato et al. | 345/173 |
| 2005/0035947 A1 * | 2/2005 | Lutian | 345/166 |

OTHER PUBLICATIONS

USPTO Advisory Action for U.S. Appl. No. 12/413,584 dated Apr. 27, 2012; 3 pages.
USPTO Advisory Action for U.S. Appl. No. 12/413,584 dated Jul. 23, 2012; 3 pages.
USPTO Final Rejection for U.S. Appl. No. 12/413,584 dated Feb. 10, 2012; 8 pages.
USPTO Final Rejection for U.S. Appl. No. 12/413,584 dated May 31, 2012; 10 pages.
USPTO Non-Final Rejection for U.S. Appl. No. 12/413,584 dated Sep. 15, 2011; 8 pages.

* cited by examiner

*Primary Examiner* — Van Chow

(57) ABSTRACT

Finger navigation methods, devices and systems are disclosed. In one embodiment the system comprises a light source configured to radiate a light beam towards a tactile surface. The system also comprises a photo detector module configured to sense speckle beams emitted by a target surface navigating the tactile surface in response to light hitting the target surface. The system further comprises a processor configured to track a movement of the target surface with respect to the tactile surface based on output from the photo detector module and a conductor structure for capacitive sensing of the target surface with respect to the tactile surface. The conductor structure is configured to determine a plurality of navigational functionalities based on the capacitive sensing of the target surface with respect to the tactile surface, including at least one of single click, double click, and scrolling.

19 Claims, 6 Drawing Sheets

CURRENT SENSOR OUTPUT MEASUREMENT SYSTEM AND METHOD

CROSS REFERENCE TO RELATED APPLICATION

This application is a continuation of U.S. application Ser. No. 12/413,584, filed Mar. 29, 2009, which claims the benefit of U.S. Provisional Patent Application No. 61/083,953, filed Jul. 28, 2008, both of which are incorporated herein by reference.

FIELD OF TECHNOLOGY

Embodiments of the present invention relate to the field of electronics. More particularly, embodiments of the present invention relate to an interactive sensor device, system, and method.

BACKGROUND

Finger navigation technology in computer and/or handheld devices may employ capacitive touch pads ("cap-sensing") or mechanical joysticks. For example, a finger may navigate a capacitive touch pad or screen, and the capacitance formed between the finger and the tactile surface of the capacitive touch pad may be processed to track the finger moving across the capacitive touch pad.

However, cap-sensing finger navigation technology may not provide high-resolution position tracking in a small area since a number of sizable electronic and/or mechanical components, such as one or more conductive structures, wires, capacitive sensors, etc., are to be implemented within the electronic device. Additionally, an increased footprint of the platform may be used to perform the tracking function, while the observed navigation of the finger represented by a cursor on the capacitive touch pad or screen may remain coarse due to the latency effect characterized by the cap-sensing technology.

SUMMARY

One embodiment of the present invention pertains to a finger navigation sensor system which comprises a light source for illuminating light towards a tactile surface. The sensor system also comprises a photo detector module for sensing speckle beams emitted by a target surface navigating the tactile surface in response to the light hitting the target surface. The sensor system further comprises a processor configured to track a movement of the target surface with respect to the tactile surface if a size of a liftoff of the target surface with respect to the tactile surface is less than a threshold value. In one embodiment, the lift-off can be determined by a capacitive sensing device positioned within the tactile surface.

Another embodiment of the present invention pertains to an electronic device which comprises a tactile surface for interfacing with a target surface and a finger navigation sensor system which is described above. In one embodiment, the electronic device comprises a mobile device, such as a handheld device, a laptop, etc.

Yet another embodiment of the present invention pertains to a method of finger navigation sensor system which comprises receiving speckle beams emitted by a target surface navigating a tactile surface at a photo detector module of the sensor system when the tactile surface is illuminated by a light of the sensor system. The method also comprises determining a size of a liftoff of the target surface with respect to the tactile surface. The method further comprises tracking a movement of the target surface with respect to the tactile surface by processing the speckle beams if the size of the liftoff of the target surface with respect to the tactile surface is less than a threshold value.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, device and/or system are disclosed that recognizes small or slight finger gesture with fast response time and high resolution. Finger movement can be tracked by processing speckle beams emitted by a finger moving with respect to a transparent tactile surface of an electronic device in contact with the finger when a light source radiates a light (e.g., a laser light, an LED light, etc.) to the tactile surface. Based on the intensity of the speckle beams, the finger movement may be registered or dismissed by the data processing system for the electronic device. For instance, if the finger is not proximate enough to the tactile surface, tracking data for the finger may not be processed for further action, thus saving power and/or allowing the processing resources of the electronic device to tend to other functions. That is, the tracking data are automatically generated when the finger is touching or is proximate enough to the tactile surface. Since the tracking data are based on the energy level of light being emitted, the response time of the electronic device may be faster than one that relies on capacitive sensing technology. Finger proximity to the tactile surface may be detected via a capacitive sensor according to one embodiment.

Thus, embodiments of the invention provide high resolution finger navigation technology in a smaller package, which may be useful for applications in mobile devices. Through utilizing an optical based finger navigation technique which discriminately monitors the finger movement based on the proximity of the finger with respect to the tactile surface, the embodiments provide a faster and more precise touch sensing device, system and/or method at a higher resolution with reduced latency.

Reference will now be made in detail to the embodiments of the invention, examples of which are illustrated in the accompanying drawings. While the invention will be described in conjunction with the embodiments, it will be understood that they are not intended to limit the invention to these embodiments. On the contrary, the disclosure is intended to cover alternatives, modifications and equivalents, which may be included within the spirit and scope of the invention. Furthermore, in the detailed description, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure aspects of the present invention.

Figure 1:
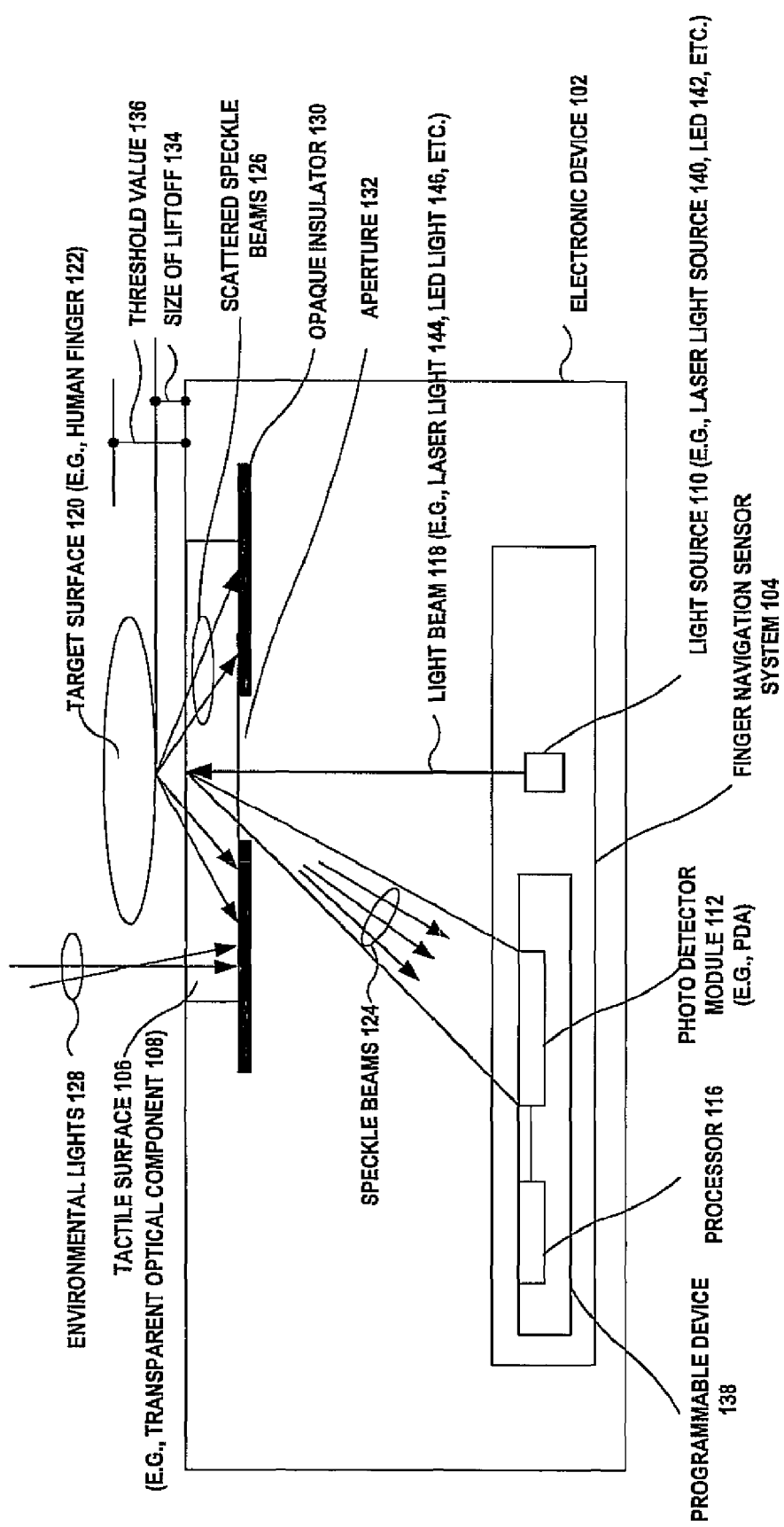
FIG. 1 illustrates an electronic device with an exemplary finger navigation sensor system, according to one embodiment of the present invention.

FIG. 1 illustrates an electronic device 102 with an exemplary finger navigation sensor system 104, according to one embodiment of the present invention. As illustrated in FIG. 1, the electronic device 102 comprises the finger navigation sensor system 104 and a tactile surface 106 (e.g., a transparent optical component 108 such as a glass, a polycarbonate, etc.). In one exemplary implementation, the optical component 108 may be less than 2 mili-meters in thickness. In one embodiment, the electronic device 102 may be a mobile device, such as a laptop or a handheld device (e.g., mobile phone, a personal digital assistant (PDA), etc.).

The finger navigation sensor system 104 comprises a light source 110 (e.g., a laser light source 140, a light emitting diode (LED) 142, etc.), a photo detector module 112 (e.g., a photo diode array (PDA) with a comb filter), and a processor 116 (e.g., a digital signal processor). In one embodiment, the light source 110 may radiate a light beam 118 (e.g., a laser light 144, an LED light 146, etc.) towards the tactile surface 106. As the light 118 (e.g., the laser light 144 of 850 nm in wavelength) hits a target surface 120 (e.g., a human finger 122, a stylus, etc.), speckle beams 124 and/or scattered speckle beams 126 may be emitted by the target surface 120 toward the photo detector module 112. It is appreciated that the speckle beams 124 are interference patterns emitted from the target surface 120 when the target surface 120 is illuminated by the light 118. Scattered speckle beams 126 and/or other environmental lights 128 may be blocked by an opaque insulator 130 with an aperture 132 formed below the tactile surface 106, where the aperture 132 is used to pass the light 118 and the speckle beams 124.

The photo detector module 112 then senses the speckle beams 124 emitted by the target surface 120 navigating the tactile surface 106 in response to the light 118 hitting the target surface 120. Next, the processor 116 is configured to track movement of the target surface 120 with respect to the tactile surface 106 if a size of a liftoff 134 of the target surface 120 with respect to the tactile surface 106 is less than a threshold value 136 (e.g., 1 mm, 0.5 mm, 0.25 mm, etc.).

In one embodiment, it is appreciated that the size of the liftoff 134 of the target surface 120 may be determined by measuring an energy level of the speckle beams 124 received at the photo detector module 112. Accordingly, if the energy level of the speckle beams 124 is less than a cutoff energy level (e.g., which may translate to the threshold value 136 or the stable lift cutoff), the target surface 120 may be determined to be out of tracking range from the tactile surface 106, thus blanking tracking data generated in response to the speckle beams 124 or putting the data processing system in an idle mode. In one embodiment, the photo detector module 114 and the processor 116 may be embedded in a programmable device 138. In one exemplary implementation, the thickness of the finger navigation sensor system 104, the tactile surface 106, and the components which are implemented between them may be less than one centimeter.

Figure 2:
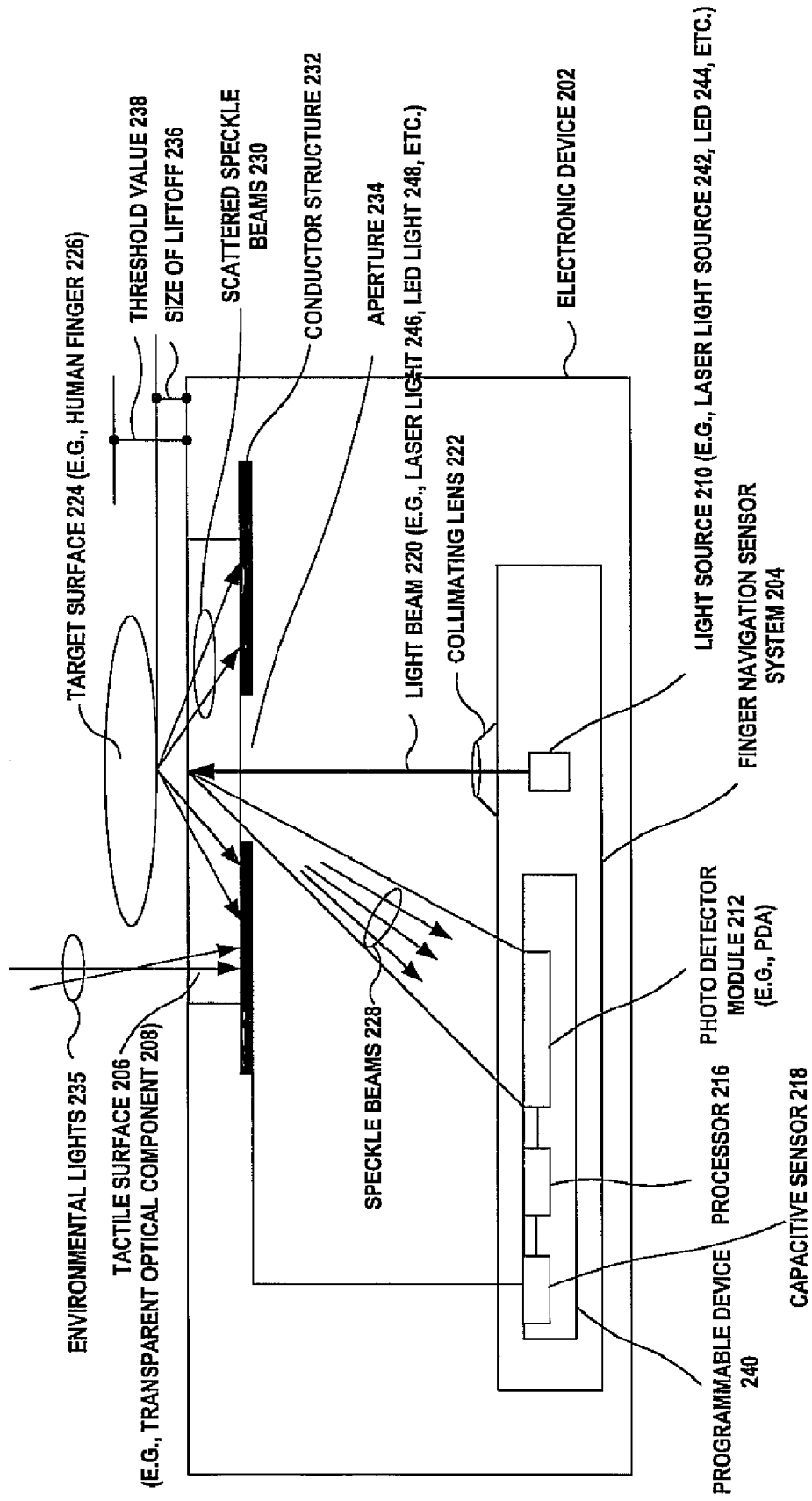
FIG. 2 illustrates an electronic device with another exemplary finger navigation sensor system, according to one embodiment of the present invention.

FIG. 2 illustrates an electronic device 202 with another exemplary finger navigation sensor system 204, according to one embodiment of the present invention. As illustrated in FIG. 2, the electronic device 202 comprises the finger navigation sensor system 204 and a tactile surface 206 (e.g., a transparent optical component 208 such as a glass, a polycarbonate, etc.). In one embodiment, the electronic device 202 may be a mobile device, such as a laptop, a handheld device (e.g., a mobile phone, a personal digital assistant (PDA), etc.), etc.

The finger navigation sensor system 204 comprises a light source 210 (e.g., a laser light source 242, an LED 244, etc.), a photo detector module 212 (e.g., a photo diode array (PDA) 214 with a comb filter), a processor 216 (e.g., a digital signal processor), and a capacitive sensor 218. In one embodiment, the light source 210 may radiate a light beam 220 (e.g., a laser light 246, an LED light 248, etc.) towards the tactile surface 206. In one embodiment, the finger navigation sensor system 204 further comprises a collimating lens 222 placed above the light source 210 for focusing the light 220 into a parallel beam. As the light 220 hits a target surface 224 (e.g., a human finger 226, a stlus, etc.), speckle beams 228 and/or scattered speckle beams 230 may be emitted by the target surface 224 toward the photo detector array 212.

As illustrated in FIG. 2, a conductor structure 232 is formed below the tactile surface 206 such that the stable lift cutoff of the target surface 224 may be determined with respect to the tactile surface 206 by measuring capacitance formed between the target surface 224 and the conductor structure 232. The conductor structure 232 may further comprise an opaque insulator with an aperture 234, where the light 220 and the speckle beams 228 are allowed to pass through the aperture 234, but some of the scattered speckle beams 230 and/or other environmental lights 235 may be blocked by the opaque insulator. In addition, as will be illustrated in FIG. 3, the conductor structure 232 is also configured to provide a plurality of navigational functionalities of the target surface 224 moving with respect to the tactile surface 206.

The photo detector module 212 then senses the speckle beams 228 emitted by the target surface 224 navigating the tactile surface 206 in response to the light 220 hitting the target surface 224 and reflected through the aperture 234. Next, the processor 216 is configured to track a movement of the target surface 224 with respect to the tactile surface 206 if a size of a liftoff 236 of the target surface 224 with respect to the tactile surface 206 is less than a threshold value 238. In this embodiment, the capacitive sensor 218 can be used to determine liftoff amount.

In one embodiment, if the capacitance measured by the capacitive sensor 218 is less than a cutoff capacitance value (e.g., which translates to the threshold value 238 or the stable lift cutoff), the tracking data generated in response to the speckle beams 228 may be blanked, or the tracking of the target surface 224 with respect to the tactile surface 206 may be terminated. In one embodiment, the photo detector module 212, the processor 216, and the capacitive sensor 218 may be embedded in a programmable device 240. In one exemplary implementation, the thickness of the finger navigation sensor system 204, the tactile surface 206, and the components which are implemented between them may be less than one centimeter. With respect to FIG. 2, the capacitive sensor may also be used to detect single and double clicks, etc. of the finger on the tactile surface.

Figure 3:
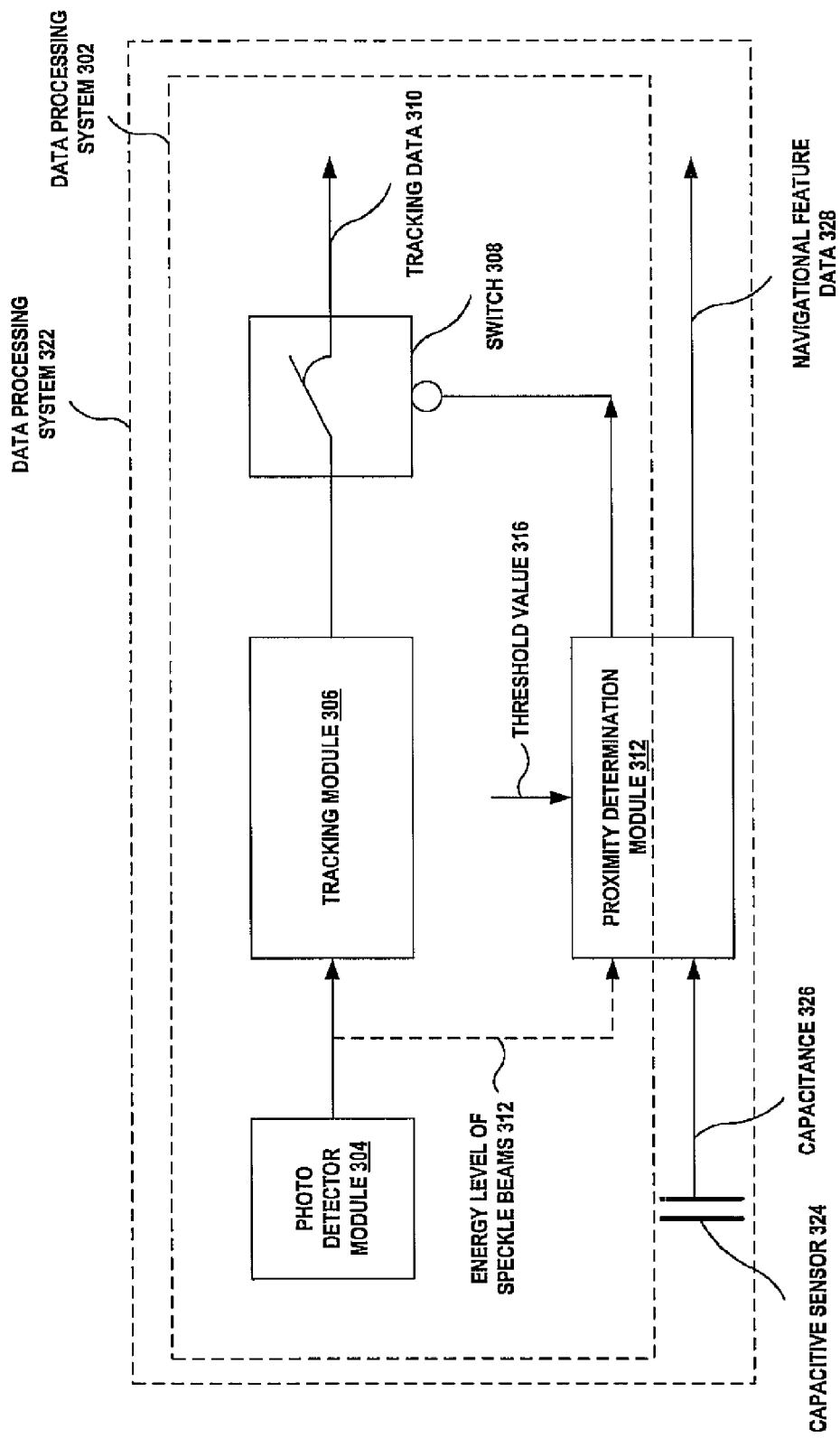
FIG. 3 illustrates an exemplary data processing system for the finger navigation sensor system of FIG. 1 and an exemplary data processing system for the finger navigation sensor system of FIG. 2, according to one embodiment of the present invention.

FIG. 3 illustrates an exemplary data processing system 302 for the finger navigation sensor system 104 of FIG. 1 and an exemplary data processing system 322 for the finger navigation sensor system 204 of FIG. 2, according to one embodiment of the present invention. In FIG. 3, the data processing system 302 for the finger navigation sensor system 104 of FIG. 1 comprises a photo detector module 304, a tracking module 306, a switch 308, and a proximity determination module 312. It is appreciated that the photo detector module 304 is an example embodiment of the photo detector module 112 of FIG. 1.

According to the system of FIG. 1, in the data processing system 302 of FIG. 3, tracking data 310, which report changes in x, y, and/or z coordinates associated with the target surface 120 navigating with respect to the tactile surface 106, may be generated if the energy level of speckle beams 314 is determined to be greater than a threshold value 316 by the proximity determination module 312. For example, if the energy level of the speckle beams 124 received by the photo detector module 112 is greater than the threshold value 316 (e.g., which may indicate that the target surface 120 is proximate enough to the tactile surface 106), the switch 308 is turned on to generate the tracking data 310. Conversely, if the energy level of the speckle beams 124 received by the photo detector module 112 is less than the threshold value 316, the switch 308 is turned off to disable generation of the tracking data 310. It is appreciated that the tracking module 306 and the proximity determination module 312 in the data processing system 302 may be implemented in software and/or hardware. In one embodiment, using the proximity determination module 312, the processor 116 may be configured to perform a proximity determination of the target surface 120 with respect to the tactile surface 106 based on the energy level of the speckle beams 312.

In FIG. 3, the data processing system 322 for the finger navigation sensor system 204 of FIG. 2 comprises the photo detector module 304, the tracking module 306, the switch 308, the proximity determination module 312, and a capacitive sensor 324. It is appreciated that the photo detector module 304 is an example embodiment of the photo detector module 212 of FIG. 2.

In accordance with FIG. 2, in the data processing system 322 of FIG. 3, the tracking data 310, which report changes in x, y, and/or z coordinates associated with the target surface 222 navigating with respect to the tactile surface 206, may be generated if capacitance 326 formed between the target surface 222 and the tactile surface 206 measured by the capacitive sensor 324 is determined to be greater than the threshold value 316 (e.g., which may indicate that the target surface 222 is proximate enough to the tactile surface 206) by the proximity determination module 312. For example, if the capacitance 326 is greater than a cut off capacitance of the threshold value 316, the switch 308 is turned on to generate the tracking data 310. Conversely, if the capacitance 326 is less than the cut off energy level, the switch 308 is turned off to disable generation of the tracking data 310.

It is appreciated that the tracking module 306 and the proximity determination module 312 in the data processing system 322 may be implemented in software and/or hardware. In one embodiment, using the proximity determination module 312, the processor 216 may be configured to perform a proximity determination of the target surface 222 with respect to the tactile surface 206 based on the capacitive sensing of the target surface 222. Furthermore, the processor 216 may be configured to determine a plurality of navigational functionalities (e.g., single click, double click, scroll, etc.), thus generating navigational feature data 328 based on the sensing of the speckle beams 228 and/or the capacitive sensing of the target surface 222 via capacitive sensor 324.

Figure 4:
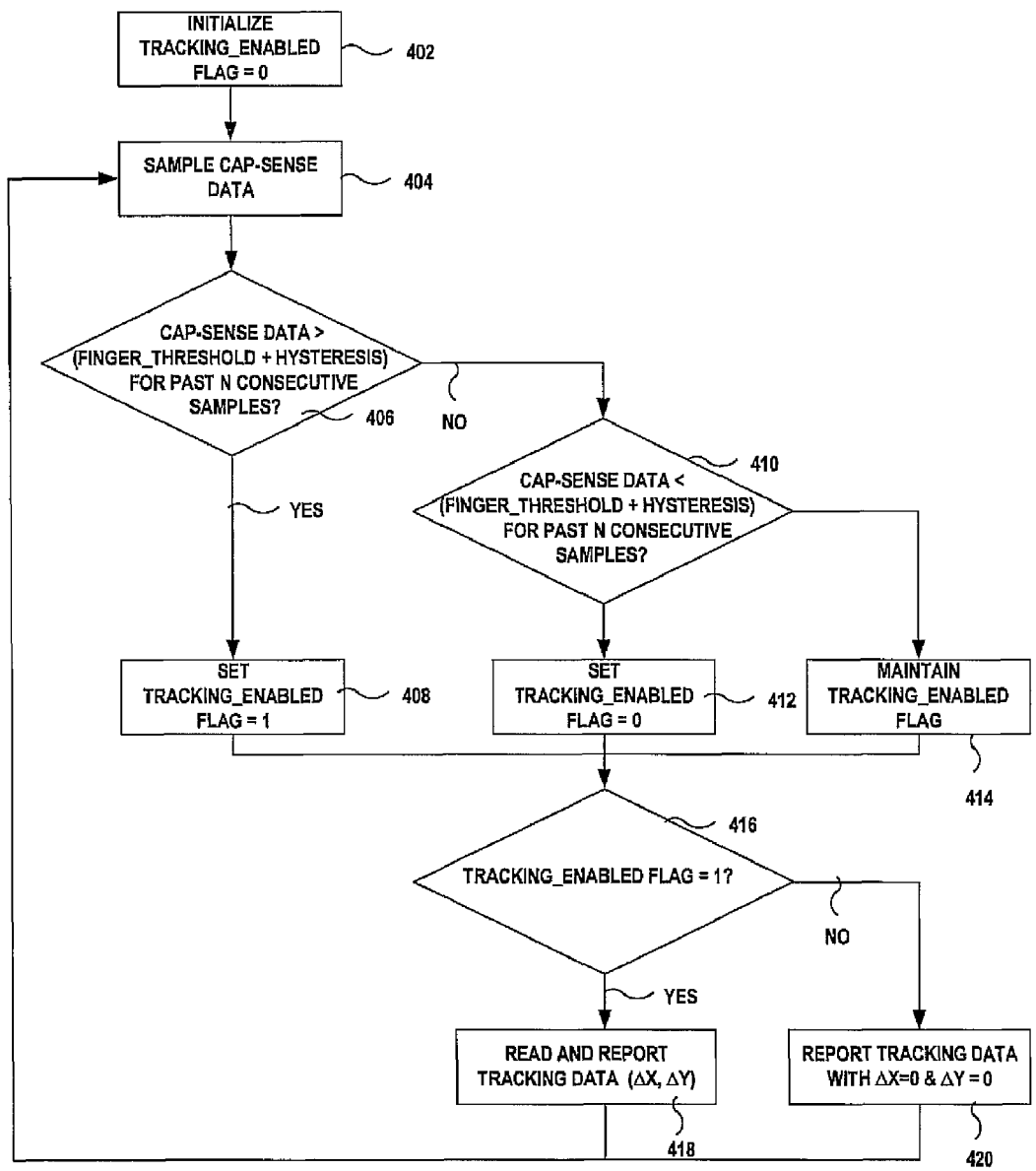
FIG. 4 is an exemplary computer controlled flow diagram for the data processing system for the finger navigation sensor system of FIG. 2, according to one embodiment of the present invention.

FIG. 4 is an exemplary computer controlled flow diagram for the data processing system 322 for the finger navigation sensor system 204 of FIG. 2, according to one embodiment of the present invention. In step 402, tracking_enabled flag is set to "0." In step 404, capacitive sensing data are sampled. In step 406, the capacitive sensing data for the past N (e.g., which is greater than 1) consecutive samples are compared with a cutoff value. In one embodiment, the cutoff value is the sum of the threshold capacitance due to a finger (e.g., or any other type of target surface) touching the tactile surface and the hysteresis which compensates the latency effect due to the activation or deactivation of the sensor system. If the capacitive sensing data is greater than the cutoff value in step 406, tracking_enabled flag is set to "1" in step 408.

If the capacitive sensing data is less than the cutoff value in step 410, the tracking_enabled flag is set to "0" in step 412, or otherwise the tracking_enabled flag is maintained in step 414. Then, if the tracking_enabled flag is equal to "1" in step 416, tracking data, which report changes in the x-coordinate, y-coordinate, and/or z-coordinate may be read and reported in step 418 via the photo detector module. Otherwise, the tracking data reporting no change in the coordinates is generated in step 420. Additionally, in step 420, the photo sensor system can be put in a low power mode to preserve power.

Figure 5:
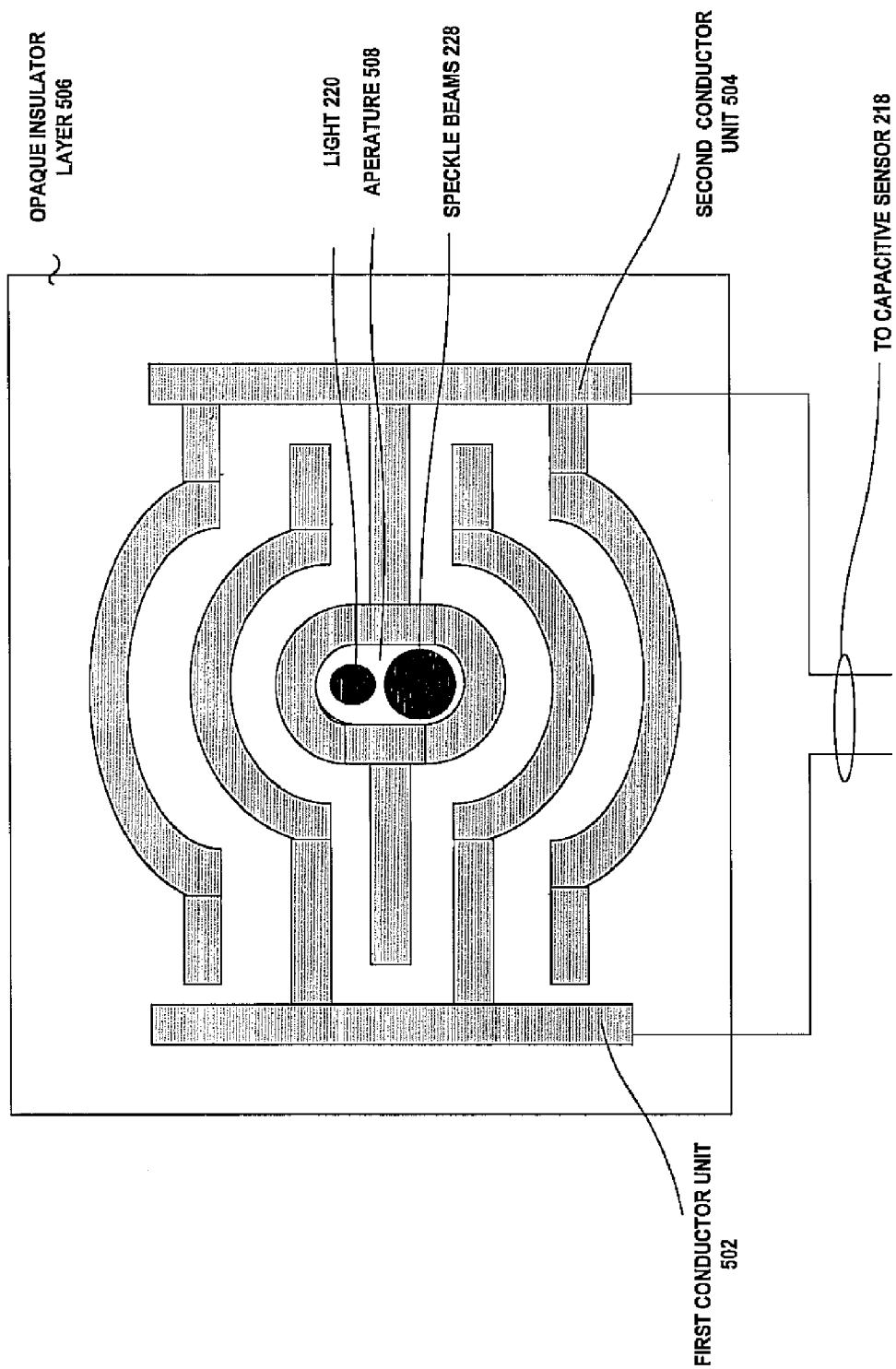
FIG. 5 illustrates an exemplary conductive structure coupled to the capacitive sensor of the finger navigation sensor system of FIG. 2, according to one embodiment.

FIG. 5 illustrates an exemplary conductive structure coupled to the capacitive sensor 218 of the finger navigation sensor system 204 of FIG. 2, according to one embodiment. In FIG. 5, the conductive structure comprises a first conductive unit 502 and a second conductive unit 504 formed on an opaque insulator layer 506. The conductive structure further comprises an aperture 508 (e.g., a precision aperture of a pinhole size) which allows passing of the light 220 or the speckle beams 228 of FIG. 2. The opaque insulator layer 506, on the other hand, is used to block the scattered speckle beams 230 and/or the environmental lights 235 of FIG. 2. It is appreciated that the conductor structure may take a different shape than what is illustrated in FIG. 5.

It is also appreciated that the conductor structure may be used in power saving features or aesthetic purposes for an electronic device (e.g., a handheld device). For instance, the conductor structure in the electronic device can be used to determine whether there is any target surface (e.g., a finger) close enough to the tactile surface and to put the electronic device in a low power mode if the target surface is not detected within vicinity of the stable lift cutoff for the target surface. The conductor structure in the electronic device can be also used to light up the electronic device if a target surface detected happens to be proximate to the tactile surface.

Figure 6:
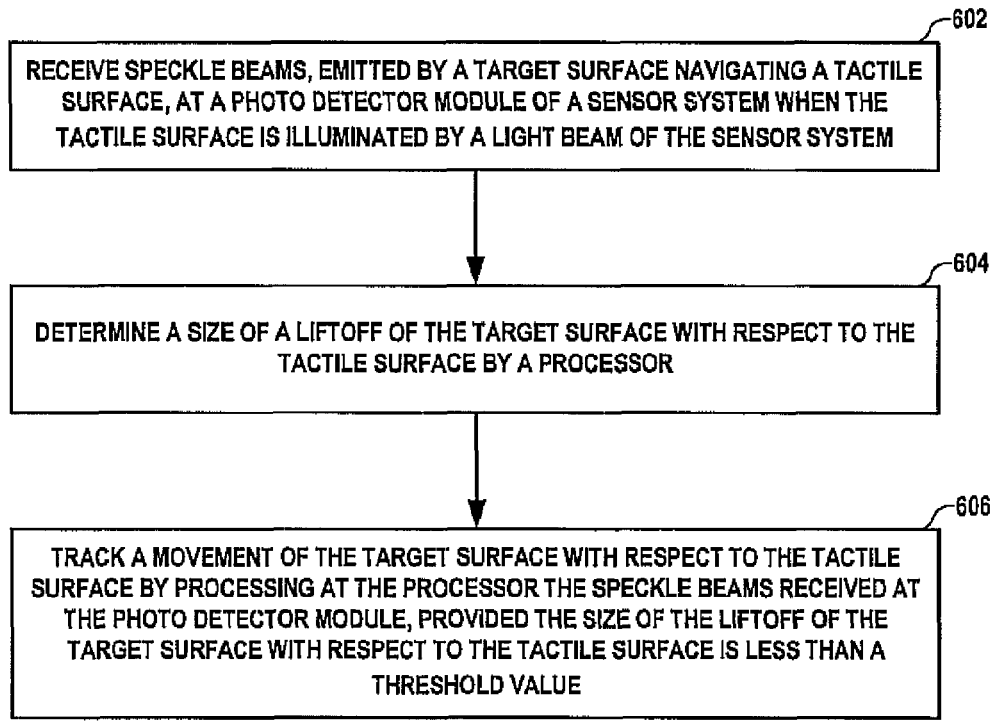
FIG. 6 illustrates a process flow chart of an exemplary method for a finger navigation sensor system, according to one embodiment of the present invention.

FIG. 6 illustrates a process flow chart of an exemplary method for a finger navigation sensor system, according to one embodiment of the present invention. In operation 602, speckle beams emitted by a target surface navigating a tactile surface are received at a photo detector module of the sensor system when the tactile surface is illuminated by a light beam of the sensor system. In operation 604, a size of a liftoff of the target surface with respect to the tactile surface is determined by a processor. In one embodiment, the size of the liftoff is measured by a measurement of the speckle beams received at the photo detector module (of FIG. 1) and/or a measurement of a capacitance between the target surface and the tactile surface (of FIG. 2).

In operation 606, a movement of the target surface with respect to the tactile surface is tracked by processing at the processor the speckle beams received by the photo detector module provided that the size of the liftoff of the target surface with respect to the tactile surface is less than a threshold value. In one embodiment, the tracking of the movement of the target surface is disabled if the size of the liftoff of the target surface is greater than the threshold value. It is appreciated that the methods disclosed in FIG. 6 may be implemented in a form of a machine-readable medium embodying a set of instructions that, when executed by a machine, cause the machine to perform any of the operations disclosed herein.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present disclosure is not intended to be limited to the embodiments shown herein but is to be accorded the widest scope consistent with the principles and features disclosed herein.

The invention claimed is:

1. A finger navigation sensor system, comprising:
   a light source configured to radiate a light beam towards a tactile surface;
   a photo detector module configured to sense speckle beams from a target surface navigating the tactile surface in response to light hitting the target surface;
   a processor configured to report tracking data on movement of the target surface with respect to the tactile surface based on output from the photo detector module; and
   a conductor structure for capacitive sensing of the target surface with respect to the tactile surface,
   wherein the target surface comprises a human finger and wherein the conductor structure is configured to detect based on the capacitive sensing of the human finger with respect to the tactile surface, single click, double click, and scrolling.

2. The system of claim 1, wherein the processor is further configured to block reporting of tracking data provided a measured size of a liftoff of the target surface with respect to the tactile surface is more than a threshold value.

3. The system of claim 2, wherein the measured size of the liftoff of the target surface is determined by measuring an energy level of the speckle beams received at the photo detector module.

4. The system of claim 2, wherein the measured size of the liftoff of the target surface is determined by measuring a capacitance formed between the target surface and the conductor structure.

5. The system of claim 1 wherein the conductor structure comprises an aperture configured to allow the light beam to radiate towards the tactile surface and the speckle beams to reach the photo detector.

6. The system of claim 1, wherein the tactile surface comprises a transparent optical component.

7. The system of claim 1, wherein the photo detector module comprises a photo diode array (PDA).

8. A finger navigation sensor system, comprising:
   a light source configured to radiate a light beam towards a tactile surface;
   a photo detector module configured to sense speckle beams from a target surface navigating the tactile surface in response to light hitting the target surface;
   a processor configured to track a movement of the target surface with respect to the tactile surface based on output from the photo detector module provided a measured size of a liftoff of the target surface with respect to the tactile surface is less than a threshold value;
   a conductor structure for capacitive sensing of the target surface with respect to the tactile surface, wherein the target surface comprises a human finger and wherein the conductor structure is configured to detect based on the capacitive sensing of the human finger with respect to the tactile surface, single click, double click, and scrolling; and
   wherein the measured size of the liftoff of the target surface is determined by measuring an energy level of the speckle beams received at the photo detector module.

9. The system of claim 8, wherein the tactile surface comprises a transparent optical component.

10. The system of claim 8, wherein the photo detector module comprises a photo diode array (PDA).

11. The system of claim 8, wherein the conductor structure comprises an aperture configured to allow the light beam to radiate towards the tactile surface and the speckle beams to reach the photo detector.

12. The system of claim 11, wherein the conductor structure comprises two conductor units coupled to a capacitive sensor associated with the processor.

13. The system of claim 8, wherein the light source comprises a laser light source and a light emitting diode (LED).

14. An electronic device, comprising:
   a tactile surface for interfacing with a target surface; and
   a finger navigation sensor system comprising:
      a light source configured to radiate a light beam towards the tactile surface;
      a photo detector module configured to sense speckle beams from the target surface navigating the tactile surface in response to light hitting the target surface;
      a processor configured to track a movement of the target surface with respect to the tactile surface based on output from the photo detector module provided a measured size of a liftoff of the target surface with respect to the tactile surface is less than a threshold value; and
      a conductor structure formed below the tactile surface for capacitive sensing of the target surface with respect to the tactile surface,
      wherein the measured size of the liftoff of the target surface is determined by measuring a capacitance formed between the target surface and the conductor structure,
      wherein the target surface comprises a human finger and wherein the processor is further configured to determine based on the capacitive sensing of the human finger with respect to the tactile surface, single click, double click, and scrolling.

15. The device of claim 14, further comprising an opaque insulator layer having a precision aperture for passing light radiated towards the tactile surface.

16. The device of claim 14, wherein the processor is configured to perform a proximity determination of the target surface with respect to the tactile surface based on the capacitive sensing of the target surface.

17. The device of claim 14, wherein the processor is configured to determine a plurality of navigational functionalities based on the sensed speckle beams.

18. The device of claim 14, wherein the light comprises a laser light and a LED light.

19. The device of claim 14, wherein the photo detector module and the processor are integrated within a programmable device.

\* \* \* \* \*